(12) United States Patent
Kang et al.

(10) Patent No.: US 8,276,555 B2
(45) Date of Patent: Oct. 2, 2012

(54) METHOD FOR MANAGING TRANSITIONS IN INTERNAL COMBUSTION ENGINES WITH A HYBRID DRIVE POWERTRAIN

(75) Inventors: Jun-Mo Kang, Ann Arbor, MI (US); Man-Feng Chang, Troy, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 422 days.

(21) Appl. No.: 12/702,442

(22) Filed: Feb. 9, 2010

(65) Prior Publication Data

US 2011/0192373 A1    Aug. 11, 2011

(51) Int. Cl.
*F01L 1/34* (2006.01)
*B60W 10/06* (2006.01)

(52) U.S. Cl. .................. 123/90.15; 180/65.28

(58) Field of Classification Search .... 123/90.15–90.18; 180/65.28
See application file for complete search history.

(56) References Cited

U.S. PATENT DOCUMENTS

| 6,570,265 | B1 | 5/2003 | Shiraishi et al. |
| 7,016,773 | B2 * | 3/2006 | Kuroda et al. ................. 701/22 |
| 7,543,668 | B1 * | 6/2009 | Schechter ..................... 180/165 |
| 8,091,527 | B1 * | 1/2012 | Brown et al. ................. 123/295 |
| 2005/0173169 | A1 | 8/2005 | Gray, Jr. |
| 2006/0168944 | A1 * | 8/2006 | Inoue et al. ..................... 60/284 |
| 2007/0144473 | A1 * | 6/2007 | Nakamura et al. ......... 123/90.16 |
| 2007/0204816 | A1 * | 9/2007 | Russell et al. ............. 123/90.12 |
| 2007/0204817 | A1 * | 9/2007 | Russell et al. ............. 123/90.12 |
| 2009/0152027 | A1 * | 6/2009 | Kusaka et al. ............. 180/65.28 |
| 2009/0205889 | A1 * | 8/2009 | Leone ...................... 180/65.265 |
| 2009/0229564 | A1 | 9/2009 | Kang |
| 2009/0229565 | A1 * | 9/2009 | Kang et al. .................... 123/295 |

* cited by examiner

*Primary Examiner* — Erick Solis

(57) ABSTRACT

Combustion mode transitions in a hybrid powertrain are managed by coordinated control of engine valve train, engine fueling and electric machine torque generation.

15 Claims, 3 Drawing Sheets

METHOD FOR MANAGING TRANSITIONS IN INTERNAL COMBUSTION ENGINES WITH A HYBRID DRIVE POWERTRAIN

TECHNICAL FIELD

This disclosure relates to a hybrid powertrain system with an engine operable in two discrete combustion modes.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

In engine operation, the engine airflow is controlled by selectively adjusting position of the throttle valve and opening and closing of intake valves and exhaust valves. On engine systems so equipped, opening and closing of the intake valves and exhaust valves can be adjusted using a variable valve actuation system that includes variable cam phasing and a selectable multi-step valve lift, e.g., multiple-step cam lobes which provide two or more valve lift positions. In contrast to the throttle position change, the change in valve position of the multi-step valve lift mechanism is a discrete change, and not continuous.

When an engine operates in a HCCI combustion mode, the engine operates at a lean or stoichiometric air/fuel ratio operation with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

In an engine configured to operate in SI and HCCI combustion modes, transitioning between combustion modes can be complex. The engine control module must coordinate actuations of multiple devices in order to provide a desired air/fuel ratio for the different modes. During a transition between a HCCI combustion mode and SI combustion mode, valve lift switching occurs nearly instantaneously, while adjustments to cam phasers and pressures in the manifold have slower dynamics. Until the desired air/fuel ratio is achieved, incomplete combustion and misfire can occur, leading to torque disturbances.

SUMMARY

A hybrid powertrain system includes an internal combustion engine and a torque machine for transferring torque to a driveline in response to an operator torque request. The engine has two-step variable lift control mechanisms for controlling magnitude of valve lift of intake and exhaust engine valves to one of two discrete steps including low-lift valve open positions and high-lift valve open positions. A method for operating the hybrid powertrain system includes commanding a switch of the two-step variable lift control mechanism between a first of the two discrete steps and a second of the two discrete steps during engine operation. Upon commanding the switch, a fuel cut-off event in the direct injection internal combustion engine is commenced, the two-step variable lift control mechanism is switched from the first of the two discrete steps to the second of the two discrete steps, and then the direct injection internal combustion engine is restarted. During the fuel cut-off event for the direct injection internal combustion engine, the torque machine is operated to transfer torque to the driveline responsive to the operator torque request.

BRIEF DESCRIPTION OF THE DRAWINGS

One or more embodiments will now be described, by way of example, with reference to the accompanying drawings, in which.

DETAILED DESCRIPTION

Figure 1:
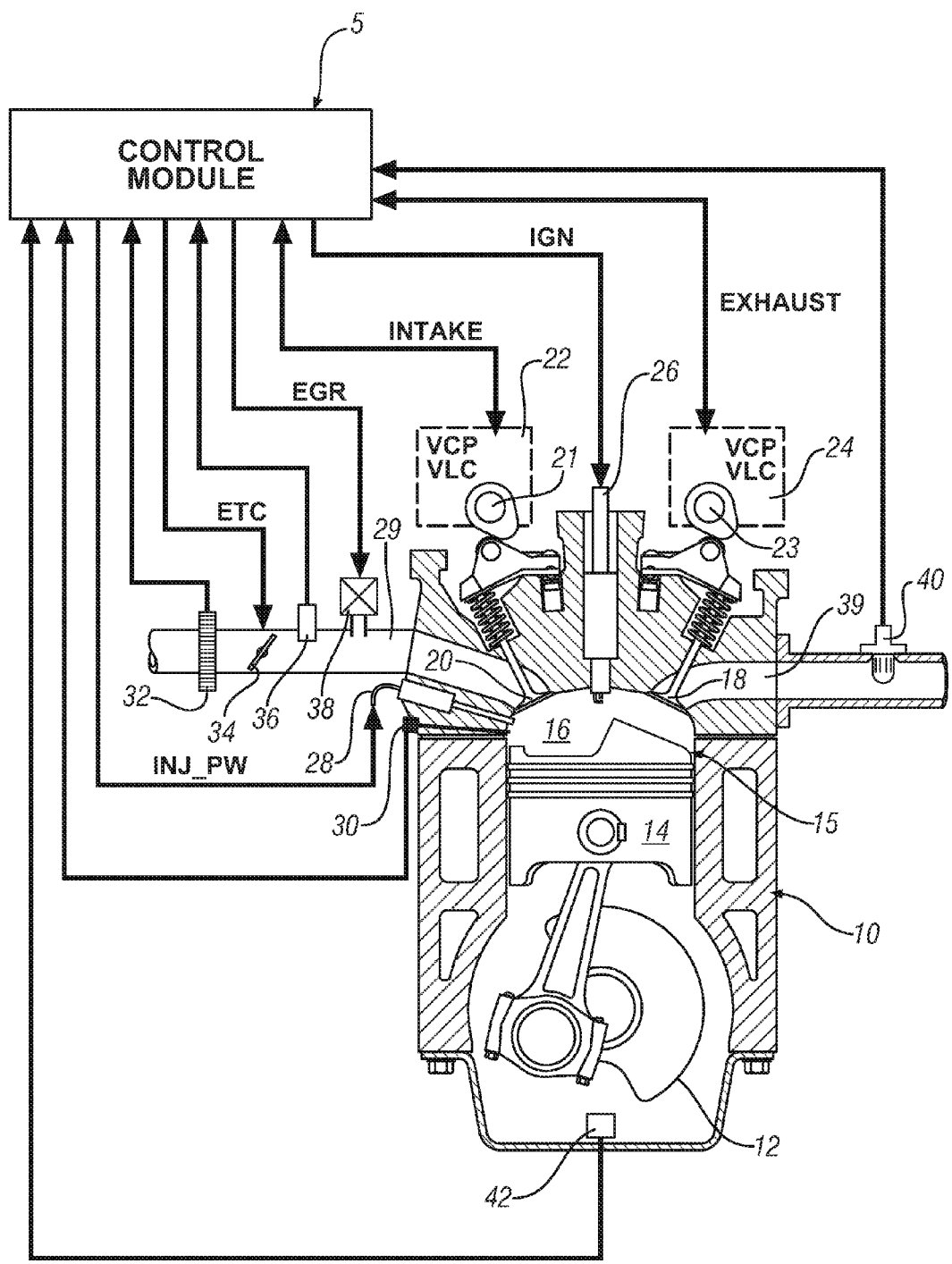
FIG. 1 is a section view of an internal combustion engine and a schematic drawing of an accompanying control module, in accordance with the present disclosure.

Referring now to the drawings, wherein the depictions are for the purpose of illustrating certain exemplary embodiments only and not for the purpose of limiting the same, FIG. 1 is a section view of an internal combustion engine 10 and a schematic drawing of an accompanying control module 5 that have been constructed in accordance with an embodiment of this disclosure. The engine 10 is selectively operative in a plurality of combustion modes, including a HCCI combustion mode and a homogeneous spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 and variably adjust and control phasing (VCP) of the intake camshaft 21 for each cylinder 15 in response to a control signal (INTAKE) from the control module 5. The exhaust VCP/VLC device 24 preferably includes a controllable mechanism operative to variably switch and control valve lift (VLC) of the exhaust valve(s) 18 and variably adjust and control phasing (VCP) of the exhaust camshaft 23 for each cylinder 15 in response to a control signal (EXHAUST) from the control module 5.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 has a fuel injection system, including a plurality of high-pressure fuel injectors 28 each configured to directly inject a mass of fuel into one of the combustion chambers 16 in response to a signal (INJ_PW) from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 has a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. However, combustion phasing may also be determined by similar methods as may be known by those skilled in the art. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, exhaust gas fractions, and non-intrusive cylinder pressure sensors.

Control module, module, controller, processor and similar terms mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation in the HCCI combustion mode, the throttle valve 34 is preferably substantially wide-open, with the engine 10 controlled at a lean or stoichiometric air/fuel ratio. The intake and exhaust valves 20 and 18 are in the low-lift valve open position and the intake and exhaust lift timing operate with NVO. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. One or more fuel injection events can be executed during an engine cycle including at least one injection during a compression phase.

During engine operation in the homogeneous spark-ignition combustion (SI) mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark-ignition is preferably discharged at a predetermined time subsequent to the fuel injection when air charge within the cylinder is substantially homogeneous.

The control module 5 transitions engine operation to the preferred combustion mode associated with the engine 10 to increase fuel efficiencies and engine stability, and/or decrease emissions. A change in one of the engine parameters, e.g., speed and load, can effect a change in an engine operating zone. The control module 5 commands a change in the preferred combustion mode associated with a change in the engine operating zone.

During combustion mode transitions, the engine 10 is controlled to operate at a preferred air/fuel ratio and the intake airflow is controlled to achieve the preferred air/fuel ratio. This includes estimating a cylinder air charge based upon engine operation in the selected combustion mode. The throttle valve 34 and intake and exhaust VCP/VLC devices 22 and 24 are controlled to achieve an intake air flowrate based upon the estimated cylinder air charge, including during a transition between the homogeneous spark-ignition and HCCI combustion modes. Airflow is controlled by adjusting the throttle valve 34 and the intake and exhaust VCP/VLC devices 22 and 24 to control the opening timing and profiles of the intake and exhaust valve(s) 20 and 18. Operation in the two combustion modes requires different settings for the intake and exhaust VCP/VLC devices 22 and 24 in terms of valve timing and profiles of the intake and exhaust valve(s) 20 and 18 and the throttle valve 34 for throttle position.

During a transition from the homogeneous spark-ignition combustion mode to the HCCI combustion mode, the engine 10 transitions to operate at a lean or stoichiometric air/fuel ratio and the airflow are controlled to achieve the desired air/fuel ratio. The control module 5 commands the throttle 34 to open to a predetermined position and the intake and exhaust VCP/VLC systems 22 and 24 to adjust the intake and exhaust cam phasers to NVO, thereby increasing manifold pressure. Airflow subsequently increases due to the increasing manifold pressure until the VLC portion of the intake and exhaust VCP/VLC systems 22 and 24 switches the intake and exhaust valves 20 and 18 from the high-lift valve open position to the low-lift valve open position. Fuel mass corresponds to engine load.

During the combustion mode transition between the homogeneous spark-ignition combustion mode and the HCCI combustion mode there is a time lag between the desired cylinder air charge and the actual cylinder air charge within the cylinder 16. This is due to dynamic response time of the intake and exhaust cam phasers of the intake and exhaust VCP/VLC systems 22 and 24, the throttle 34, and manifold pressure. Thus, for brief periods during the combustion mode transitions, the actual air/fuel ratio may be leaner than desired depending on operating conditions and the dynamic response of the engine 10. The lag between the desired cylinder air charge and the actual cylinder air charge occurs when the combustion mode switches from the homogeneous spark-ignition combustion mode to the HCCI combustion mode. Combustion stability improves in the homogeneous spark-ignition combustion mode as the throttle 34 and the intake and exhaust cam phasers of the intake and exhaust VCP/VLC systems 22 and 24 are adjusted to decrease airflow. During the combustion mode transition, the control module 5 may operate the torque machine(s) 145 to supplant the torque output of the engine 10, as explained below, to avoid combustion instability.

During a transition from the HCCI combustion mode to the homogeneous spark-ignition combustion mode, the engine 10 is transitioned to operate at a stoichiometric air/fuel ratio and the airflow is controlled to achieve the stoichiometric air/fuel ratio. The control module 5 controls the throttle 34 to a predetermined position and commands the intake and exhaust VCP/VLC systems 22 and 24 to adjust the intake and exhaust cam phasers to a positive valve overlap (PVO), thereby decreasing manifold pressure. The intake and exhaust VCP/VLC systems 22 and 24 switch the intake and exhaust valves 20 and 18 from the low-lift valve open position to the high-lift valve open position, thereby increasing airflow. Injected fuel mass corresponds to engine load.

The control module 5 adjusts the throttle 34 and signals the intake and exhaust VCP/VLC systems 22 and 24 to adjust cam phasing. These actuator changes affect the intake manifold pressure and cylinder volume occupied by the cylinder air charge to achieve a desired cylinder air charge. The desired cylinder air charge is determined based on the fuel mass injected and a desired air/fuel ratio, which is at one of a stoichiometric air/fuel ratio and a lean air/fuel ratio depending on the selected combustion mode. During the combustion mode transition, the control module 5 may operate the torque machine(s) 145 to supplant the torque output of the engine 10, as explained below, to promote smooth transitions.

Figure 2:
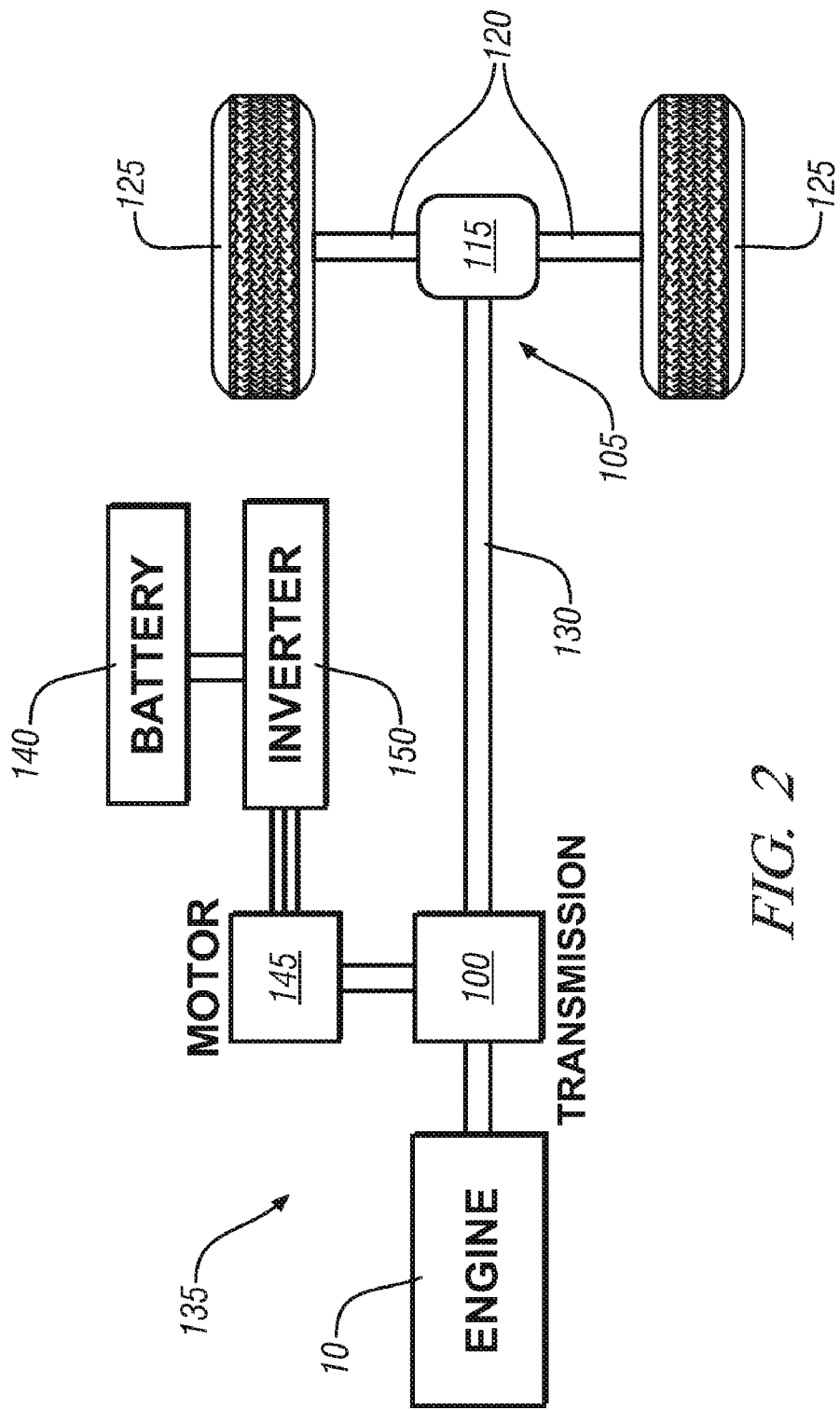
FIG. 2 is a schematic drawing of a hybrid powertrain, in accordance with the present disclosure.

FIG. 2 is a schematic depiction of a hybrid powertrain utilizing one embodiment of the engine 10. It should be noted that the hybrid powertrain is exemplary and should not be considered restrictive. The engine 10 can be coupled to a transmission device 100 to transmit tractive power to a driveline 105 of a vehicle 110. The driveline 105 includes a differential gear device(s) 115 that mechanically couples to an axle(s) 120 or a half-shaft(s) that mechanically couples to a wheel(s) 125 in one embodiment. The differential gear device 115 is coupled to an output member 130 of the hybrid powertrain system, shown generally at 135. The driveline 105 transfers tractive power between the transmission 100 and a road surface via the wheel(s) 125.

The hybrid powertrain system 135 includes an energy storage device (ESD) 140, which is depicted as a battery, that stores potential energy and is coupled to one or more torque machine(s) 145, depicted as an electric motor, to transfer power therebetween. When the ESD 140 and the torque machine(s) 145 include electric motor/generators, controllable power inverter(s) 150 can be placed therebetween and used to transform electric power from direct current to alternating current and back again. The torque machine(s) 145 convert stored energy to mechanical power and convert mechanical power to energy that can be stored in the ESD 140. The engine 10 is operative to convert vehicle stored fuel to mechanical power. Mechanical power from the engine 10 can be transferred to the transmission 100 and the torque machine(s) 145. Mechanical power from the torque machine (s) 145 can be transferred to the transmission 100 and the engine 10. Mechanical power from the driveline 105 can be transferred to the engine 10, the torque machine(s) 145, and the transmission 100 via the output member 130. The transferred mechanical power can be in the form of tractive torque for vehicle propulsion, and in the form of reactive torque for vehicle braking associated with regenerative braking functionality. As will be apparent to one skilled in the art, although electrically powered torque machine(s) 145 are depicted, other torque devices may be utilized, e.g., hydraulic or mechanical. Additionally, it will be apparent to one skilled in the art that any hybrid configuration may be used, e.g., series hybrid, parallel hybrid, or compound hybrid drive.

The engine 10 is utilized in combination with the torque machine(s) 145 for transferring torque to the driveline 105 thereby providing tractive torque through the wheel(s) 125. The intake and exhaust VCP/VLC systems 22 and 24 are controlled to switch between the high-lift valve open position and the low-lift valve open position, HL and LL respectively, which can be associated with a combustion mode transition between homogeneous spark-ignition and HCCI, respectively. When a combustion mode transitioning event occurs, a fuel cut-off event begins. The fuel cut-off event reduces the amount of fuel provided to the engine 10 until no fuel is provided to the engine and the engine no longer provides torque to the driveline 105, effectively being shutdown or off though continuing to spin. The intake and exhaust VCP/VLC systems 22 and 24 are controlled to switch between high-lift valve open position and the low-lift valve open position, HL and LL respectively. The engine is restarted including commencing engine fueling (i.e. refueling the engine) subsequent to the completed valve lift switch. As the fuel cut-off event begins, the torque reduction from the engine 10 is supplanted by torque from the torque machine(s) 145 to maintain a requested level of tractive torque.

Figure 3:
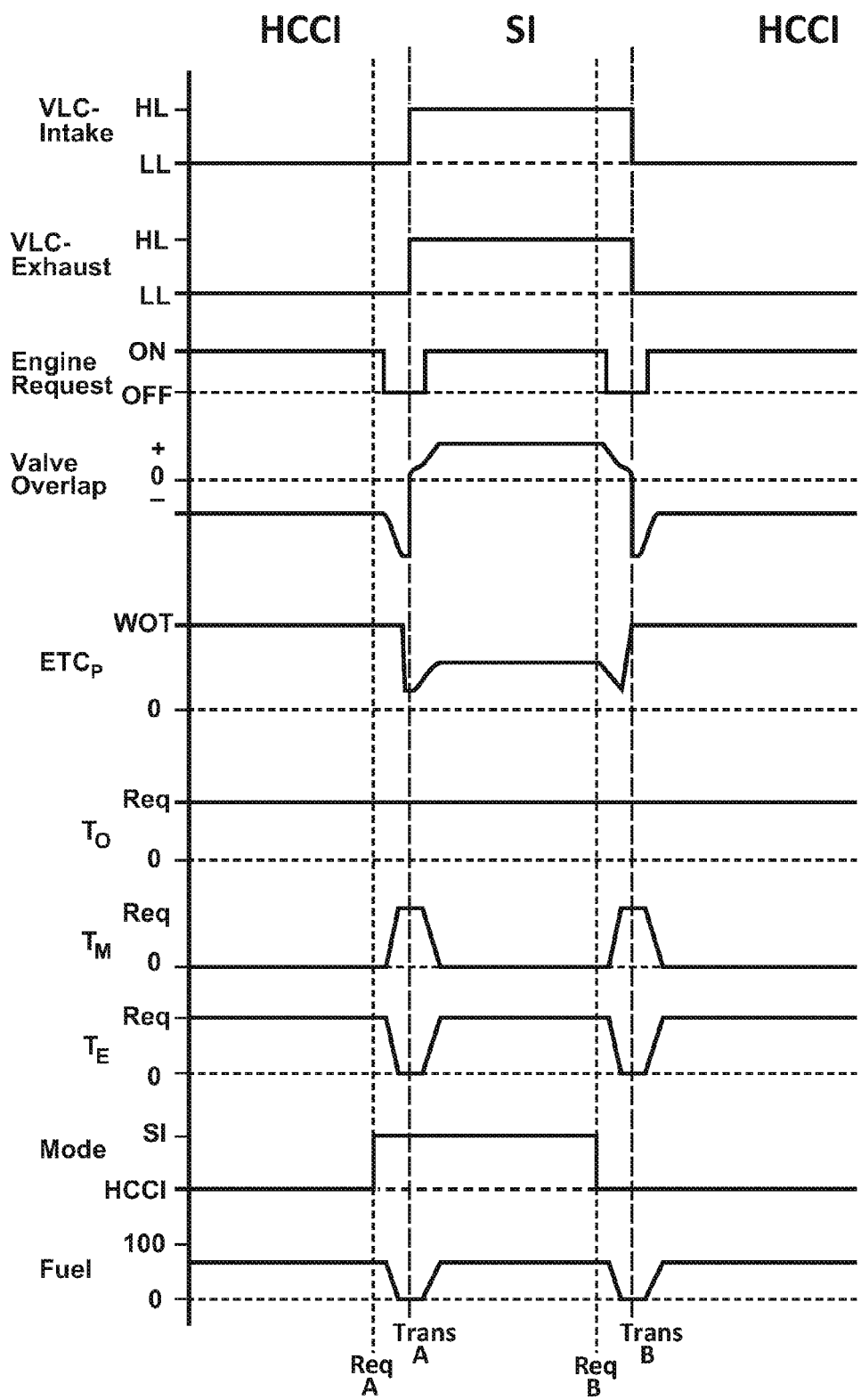
FIG. 3 is a graphical illustration depicting a set of engine parameter states, which include: combustion mode (Mode), total torque requested ($T_O$), motor torque ($T_M$), engine torque ($T_E$), electronic throttle control position ($ETC_P$), Valve Overlap, Engine Request, and VLC for both intake and exhaust valves, in accordance with the present disclosure.

FIG. 3 is a graphical illustration depicting a set of engine parameter states, which include Fuel, combustion mode (Mode), total torque requested ($T_O$), motor torque ($T_M$), engine torque ($T_E$), electronic throttle control position ($ETC_P$), Valve Overlap, Engine Request, and VLC for the Intake and Exhaust valves. To begin the first transition, the control module 5 commands a change from HCCI mode to homogeneous spark-ignition (SI) mode when appropriate based on predetermined conditions, i.e., at line "Req. A." The predetermined conditions may be, for example, based on engine load and/or speed exceeding a predetermined operating range of HCCI combustion. The control module 5 switches the Engine Request from ON to OFF thereby beginning a fuel cut-off event. The fuel cut-off event reduces the amount of fuel being received by the engine thereby decreasing NVO and reducing the engine torque output, as shown on graphs Fuel and $T_E$, respectively As the fuel cut-off event begins, the torque machine(s) 145 operates increasing its torque output, as shown on graph $T_M$, in an inverse relationship to the torque drop of the engine torque $T_E$ such that total torque requested $T_O$ is maintained. Engine torque $T_E$ contribution to the driveline becomes zero as fuel is no longer supplied to the engine 10 and therefore the torque machine(s) torque $T_M$ has completely supplanted the engine torque $T_E$. The engine is now effectively shutdown or off though continuing to spin. The control module 5 initiates the combustion mode transition, as described above and indicated on the graph by the dashed line at "Trans A." The control module 5 commands the intake and exhaust VCP/VLC systems 22 and 24 to adjust the intake and exhaust cam phasers to PVO from NVO, thereby decreasing manifold pressure. The intake and exhaust VCP/VLC systems 22 and 24 switch the intake and exhaust valves 20 and 18 from the low-lift valve open positions (LL) to high-lift valve open positions (HL), thereby increasing airflow to each cylinder 15. The control module 5 adjusts the throttle valve 34 to a predetermined position by transitioning $ETC_P$ from WOT to a predetermined angle desirable to refuel the engine 10 for a given set of operating conditions.

Once the control module 5 determines the transition period has completed, i.e., the risk of misfires or partial burns due to imprecise air flow has been reduced or eliminated, the control module 5 restarts the engine including discontinuing the fuel cut-off event and refueling the engine 10. The engine 10 then resumes torque production as indicated by the engine command switching from OFF to ON, as depicted on the engine request graph right of line Trans A. To complete the transition period, the crankshaft 12 may be put through several rotations without producing a torque output which aids in preparation to begin combustion in the homogeneous spark-ignition combustion mode. The crankshaft 12 may be rotated by providing torque from other torque sources, e.g., the torque machine(s) 145 and starter motor, to the crankshaft 12. As refueling the engine 10 commences in homogeneous spark-ignition combustion mode, the control module 5 adjusts the throttle valve 34 thereby limiting the amount of air available within cylinder 16 and meters the fuel charge and spark timing such that such that stoichiometric combustion can occur. Preferably, a fuel injection event is executed during compression phase of an engine cycle, preferably substantially before TDC. Spark-ignition is preferably discharged at a predetermined time subsequent to the fuel injection and when the fuel/air charge within the cylinder is substantially homogeneous.

Once the engine 10 produces torque and transfers torque to the transmission 135, the torque machine(s) 145 decreases torque in an inverse relation such that total torque requested $T_O$ is met by both sources until input from the torque machine (s) 145 is no longer required signaling the end of the transition. Thus, the reduction in torque machine torque is supplanted by the engine torque. This transition may be completed slower than the transition leading to change combustion modes to help preserve a smooth transition and to prevent any shocks to the drivetrain 105 that may occur from the combustion transition. If the control module 5 determines the engine 10 has a restriction during ramping up that could cause a drivetrain shock from fuel delivery or other transition variables, the torque machine(s) 145 may compensate to maintain total torque requested $T_O$.

Transitioning from homogeneous spark-injection to HCCI combustion modes is depicted at and about dotted line Req B and dashed line Trans B. The control module 5 determines a change from homogeneous spark-injection to HCCI combustion mode is appropriate based on predetermined conditions at Req B. The predetermined conditions may be, for example, when the engine load and/or speed are within a predetermined operating range of HCCI combustion. Control module 5 requests the engine be switched from ON to OFF thereby signaling the beginning of a fuel cut-off event while reducing the amount of fuel the engine 10 receives.

During the fuel cut-off event, the throttle valve 34 begins closing along with a like reduction in engine torque while the motor torque $T_M$ supplants the engine torque $T_E$ to generate the total torque request, $T_O$. Engine torque $T_E$ contribution to the driveline becomes zero as fuel is no longer supplied to the engine 10 and therefore the torque machine(s) torque $T_M$ has completely supplanted the engine torque $T_E$. The control module 5 initiates the combustion mode transition, as represented by Trans B. The control module 5 commands the intake and exhaust VCP/VLC systems 22 and 24, to adjust the intake and exhaust cam phasers from PVO to NVO, thereby increasing manifold pressure. The intake and exhaust VCP/VLC systems 22 and 24 switch the intake and exhaust valves 20 and 18 from the high-lift valve open position to the low-lift valve open position, thereby decreasing airflow to each cylinder 15. The control module 5 controls the throttle valve position $ETC_P$ from an angle used for homogeneous spark-injection to WOT building pressure within the intake manifold 29.

Once the control module 5 determines the transition period has completed, i.e., the conditions for efficient HCCI combustion have been met thereby reducing the potential for torque interruptions and perceptible torque lag, the control module 5 discontinues the fuel cut-off event and refuels the engine 10. The engine 10 resumes torque production as indicated by the engine command switching from OFF to ON as depicted on the engine request graph right of line Trans B. As refueling the engine 10 commences in HCCI mode, engine torque $T_E$ increases and transfers torque to the transmission 135 while torque machine(s) 145 decreases torque in an inverse relation such that total torque request $T_O$ is met by both sources until input from the torque machine(s) 145 is no longer required signaling the end of the transition. Thus, the reduction in torque machine torque is supplanted by the engine torque. This transition may be completed slower than the transition leading to change combustion modes to help preserve a smooth transition and to prevent any shocks to the drivetrain 105 that may occur from the combustion transition. If the control module 5 determines the engine 10 has a restriction during ramping up that could cause a drivetrain shock from fuel delivery or other transition variables, the torque machine(s) 145 may compensate to maintain total torque request $T_O$.

Alternative embodiments may include other internal combustion engines having controllable multi-step valve opening control, including those employing multi-step valve openings and/or variable cam phasing for only the intake valves or the exhaust valves.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a hybrid powertrain system including an internal combustion engine and a torque machine for transferring torque to a driveline in response to an operator torque request, the engine having two-step variable lift control mechanisms for controlling magnitude of valve lift of intake and exhaust engine valves to one of two discrete steps including low-lift valve open positions and high-lift valve open positions, the method comprising:
   commanding a switch of the two-step variable lift control mechanism between a first of the two discrete steps and a second of the two discrete steps during engine operation;
   upon commanding the switch, commencing a fuel cut-off event in the direct injection internal combustion engine, switching the two-step variable lift control mechanism from the first of the two discrete steps to the second of the two discrete steps, and then restarting the direct injection internal combustion engine; and
   during the fuel cut-off event for the direct injection internal combustion engine, operating the torque machine to transfer torque to the driveline responsive to the operator torque request.

2. The method of claim 1, wherein commanding the switch of the two-step variable lift control mechanism between the first of the two discrete steps and a second of the two discrete steps during engine operation is associated with commanding a transition between a homogeneous charge compression-ignition combustion mode and a spark-ignition combustion mode.

3. The method of claim 2, further comprising operating the direct injection internal combustion engine at the low-lift valve open position during the homogeneous charge compression-ignition combustion mode.

4. The method of claim 2, further comprising operating the direct injection internal combustion engine at the high-lift valve open position during the spark-ignition combustion mode.

5. The method of claim 2, comprising commanding the transition between the homogeneous charge compression-ignition combustion mode and the spark-ignition combustion mode when the direct injection internal combustion engine is outside of a predefined operating range.

6. The method of claim 5, wherein the direct injection internal combustion engine is outside of the predefined operating range when the direct injection internal combustion engine is operating at greater than a predefined load.

7. The method of claim 5, wherein the direct injection internal combustion engine is outside of the predefined operating range when the direct injection internal combustion engine is operating at greater than a predefined engine speed.

8. The method of claim 1, wherein the direct injection internal combustion engine further includes a variable cam phasing device, the method further comprising during the fuel cut-off event controlling the variable cam phasing device to adjust cam phasing to reduce torque being produced by the direct injection internal combustion engine.

9. The method of claim 1, further comprising during the fuel cut-off event adjusting a throttle valve to reduce the torque being produced by the direct injection internal combustion engine.

10. The method of claim 1, wherein restarting the direct injection internal combustion engine comprises refueling the direct injection internal combustion engine.

11. The method of claim 10, wherein restarting the direct injection internal combustion engine further comprises adjusting a throttle valve to a predetermined position associated with a preferred combustion mode corresponding to operating the variable lift control mechanism at the second of the two discrete steps.

12. The method of claim 1, wherein operating the torque machine to transfer torque to the driveline responsive to the operator torque request during the fuel cut-off event for the direct injection internal combustion engine comprises operating the torque machine to supplant a reduction in engine torque resulting from the fuel cut-off event.

13. The method of claim 12, further comprising subsequent to the restarting of the direct injection internal combustion engine operating the torque machine to reduce torque machine torque in relation to an increase in engine torque resulting from the restarting of the direct injection internal combustion engine.

14. A method for operating a hybrid powertrain system including an internal combustion engine and a torque machine for transferring torque to a driveline responsive to an operator torque request, the engine selectively operated in a spark-ignition combustion mode and a homogeneous-charge compression-ignition combustion mode, the engine having a two-step variable lift control mechanisms for controlling magnitude of valve lift of intake and exhaust engine valves to one of two discrete steps including low-lift valve open positions and high-lift valve open positions, the method comprising:

monitoring an operator torque request;

commanding the engine to transition from a first of the combustion modes to a second of the combustion modes during engine operation;

commanding the two-step variable lift control mechanisms to switch from a first of the two discrete steps to a second of the two discrete steps, the first and second discrete steps corresponding to the spark-ignition combustion mode and the homogeneous-charge compression-ignition mode, respectively;

upon commanding the switch, commencing a fuel cut-off event for the internal combustion engine and then switching the two-step variable lift control mechanisms from the first of the two discrete steps to the second of the two discrete steps;

operating the torque machine to transfer torque to the driveline responsive to the operator torque request during the fuel cut-off event to supplant a reduction in engine torque resulting from the fuel cut-off event; and subsequent to completing the switching the two-step variable lift control mechanisms from the first of the two discrete steps to the second of the two discrete steps, refueling the internal combustion engine and reducing torque machine torque in relation to an increase in engine torque resulting from the refueling of the direct injection internal combustion engine.

15. A hybrid powertrain system, comprising:

an internal combustion engine and a torque machine for transferring torque to a driveline, the engine having two-step variable lift control mechanisms for controlling magnitude of valve lift of intake and exhaust engine valves to one of two discrete steps including low-lift valve open positions and high-lift valve open positions;

a control module commanding a switch of the two-step variable lift control mechanism between a first of the two discrete steps and a second of the two discrete steps during engine operation;

upon commanding the switch, commencing a fuel cut-off event in the direct injection internal combustion engine, switching the two-step variable lift control mechanism from the first of the two discrete steps to the second of the two discrete steps, and then restarting the direct injection internal combustion engine; and during the fuel cut-off event for the direct injection internal combustion engine, operating the torque machine to transfer torque to the driveline to supplant a reduction in engine torque resulting from the fuel cut-off event.

* * * * *